Nov. 24, 1959  R. W. TAFEL ET AL  2,914,268
CAMERA MAGAZINE BRAKE CONTROL AND FILM FAILURE MECHANISM
Filed June 7, 1955  2 Sheets-Sheet 1

INVENTORS
ROBERT W. TAFEL
FRANK E. SMITH
BY
ATTORNEYS

United States Patent Office 2,914,268
Patented Nov. 24, 1959

2,914,268

CAMERA MAGAZINE BRAKE CONTROL AND FILM FAILURE MECHANISM

Robert W. Tafel, Drexel Hill, and Frank E. Smith, Philadelphia, Pa., assignors to the United States of America as represented by the Secretary of the Navy Application June 7, 1955, Serial No. 513,920

11 Claims. (Cl. 242—71.5)

(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of application Serial No. 439,168, filed June 24, 1954, for Camera Magazine Brake Control and Film Failure Mechanism, now abandoned.

The increasing use of high speed, jet type, photographic aircraft and the requirement for low altitude photographic reconnaissance have combined to produce large image motion velocities that, for reasons set forth below, are not readily obtainable in existing camera shutter and film magazine devices now in use.

The present invention is designed to help meet this problem and relates to a mechanism for the intermittent feeding of roll film through the magazine of an aerial camera designed for the above described use and having means for preventing overrun of the film when the film is cyclically halted and further means integral therewith for indicating breakage of the film.

Previous types of braking mechanisms for such intermittent material feeding involved the use of pawl and ratchet devices acting through a snubbing spring. The prior art devices were not satisfactory for high speed intermittent feeding because the rate of travel of the ratchet became so great that the pawl frequently failed to engage the ratchet to arrest flotation of the member with which the ratchet was supposed to be engaged. As a result, performance was unreliable and cycling speed in aerial cameras was very limited. Another disadvantage of prior art devices is the formation of a slack loop of film after each stopping due to the inertia effects of the spools involved.

The inventive mechanism overcomes these and other disadvantages of the prior art and in addition presents advantages in performance, higher film speeds in devices such as aerial cameras, reliability of feeding operations, and the addition of a positive warning control in the event of a failure causing interruption in the film feeding or in the event of film breakage. The slack loop formation has been eliminated and the inertias of the supply and take-up spools have been absorbed with a minimum of film or material overtravel. The latter has been accomplished by the use of a supply spool brake solenoid, the operating cycle of which has been designed to prevent overheating by this circuit.

A high speed shutter arrangement useful in cameras employing the improved magazine of this application is the subject of another application, Serial No. 436,744, filed June 14, 1954, under the names of Robert W. Tafel, Vincent F. Cutilli, and William J. Moore, now abandoned.

An object of this invention is to provide means for preventing overrun of roll film in a camera fed intermittently at high speeds from a supply spool to a take-up spool and incorporating an integral material feeding failure warning means.

Another purpose of the invention is to provide a mechanism for controlling intermittent feeding of a strip material, such as roll film, at relatively high speeds in which the necessity for pawl and ratchet braking devices for the supply spool is avoided.

Another aim of the device is to present an aerial camera film feed mechanism wherein improvement of performance and cycling speed is inherent.

Another object of the invention is to provide a film feed mechanism with an improved feeding operation providing for a positive warning control in the event of failure of the assembly causing interruption in film feeding or in the event of film breakage.

Another object of the invention is to provide a film feeding mechanism eliminating slack loop formation and providing for absorption of the inertia of the supply and take-up spools with a minimum of overtravel.

Another aim of the invention is to provide a film feeding mechanism wherein the supply spool is maintained in a locked condition at all times except when the film is unwinding therefrom.

Still another purpose of the invention is to present a film feed mechanism which will eliminate blurred pictures due to film movement during exposure by using a positive acting solenoid-actuated supply spool brake to control the overrunning effects or film spool inertia.

Other objects and many of the attendant advantages of this invention will be readily appreciated as the same becomes better understood by reference to the following detailed description when considered in connection with the accompanying drawings wherein.

Figure 1:
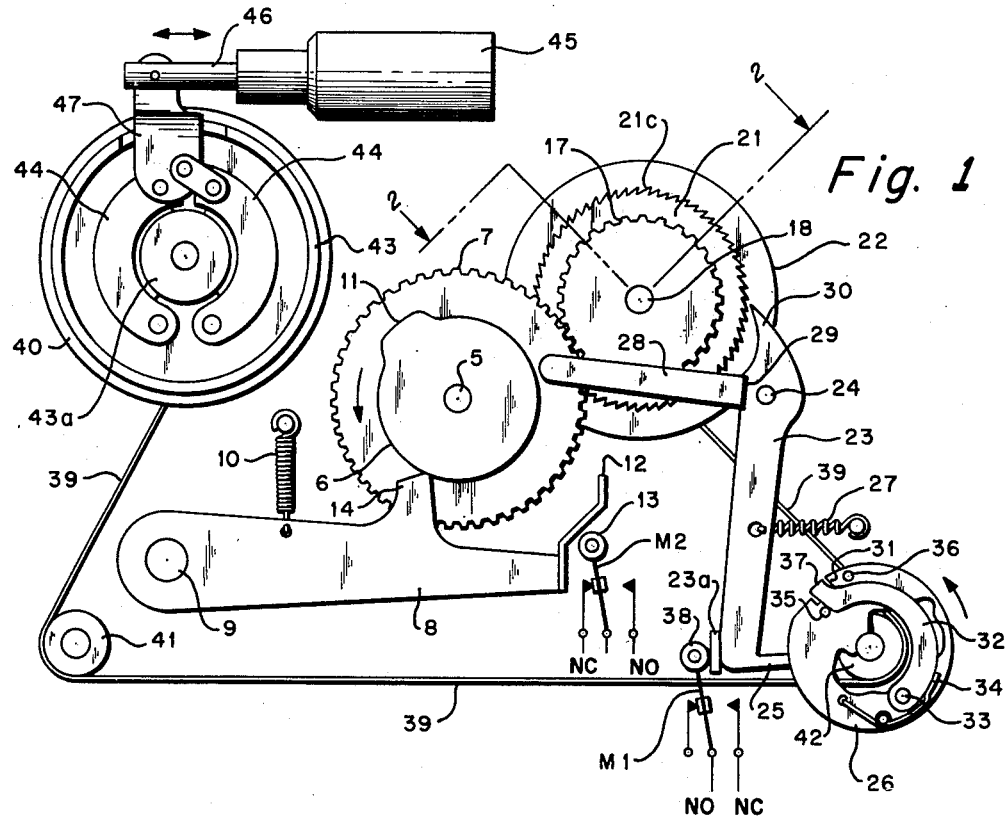
Fig. 1 is a schematic representation of the essential mechanical elements of a high speed roll film magazine utilizing a preferred embodiment of the instant invention.

Fig. 1 shows the moving parts of a high speed recycling roll film magazine for use in aerial cameras employing this invention. Shaft 5 driven by a constant speed motor (not shown) provides the input to the system and supports integrally therewith cam 6 and pinion 7. Riding on cam 6 is a cam follower lever 8 pivoted at shaft 9 and held resiliently by spring 10 against cam 6. It will be noted that the lever 8 has a bent plate 12 mounted on its tip for contacting a roller 13 of micro switch $M_2$, and when lever 8 rests against the lower surface of cam 6 the micro switch $M_2$ is in position NC. When the cam follower extension 14 of lever 8 is actuated by the raised portion 11 of cam 6, the lever 8 acting against roller 13 moves the micro switch $M_2$ into position NO, for reasons explained hereinafter. Micro switch $M_2$ is of the conventional type consisting of a center contact prong which is resiliently mounted at its base so that in its normal position, the center prong is urged into the NC position. Under the camming action of bent plate 12, the center prong is forced into the NO position, but returns to position NC because of its own resiliency when the plate 12 is withdrawn.

Pinion 7 meshes with and drives a gear 17 supported on a shaft 18; but gear 17 drives shaft 18 through a spring clutch 19 described below. Also shown in Fig. 1 are the ratchet wheel 21 and the take-up spool 22, which will be further described in connection with the spring clutch 19.

A second cam follower lever 23 hinged at shaft 24, has a detent 25, the extremity of which rides on the surface of cam 26. Lever 23 is provided with a spring 27 for insuring that detent 25 properly rides on cam 26 and has a laterally extending portion 28, the tip of which is designed for engagement with the raised portion 11 of cam 6. Extension 28 is bent at 29 away from the plane including lever 23 so as to meet cam 6 properly. A pawl 30 forms the tip of lever 23 for mating with the ratchet teeth 21c on wheel 21. Cam 26 has a slot 31 which is designed for engagement with detent 25 of lever 23. The slot 31 is provided with a guard consisting of an arcuate lever 32 pivoted at 33 and urged by spring 34 against a stop 35. A second stop 36 is provided to limit movement in the other direction. The normal position of the arcuate lever 32 is as illustrated with the square tip 37 blocking the entrance to slot 31 so that detent 25 is prevented from dropping into slot 31. However, as detent 25 rides along the surface of cam 26, which is rotating in a counter-clockwise direction, the detent 25 approaching the slot 31 will touch the shoulder of tip 37 of the lever 32 thereby pushing lever 32 away from the area blocking the entrance to slot 31, permitting detent 25 of lever 23 to drop into slot 31. When lever 23 is raised by action explained further below, out of slot 31, spring 34 will urge the guard 32 back against stop 35 thus preventing detent 25 from again dropping into the slot 31 except by making a complete cycle and pushing the shoulder 37 again in the manner just explained.

Lever 23 has a guard 23a integral therewith which is engaged with a roller 38 of a micro switch $M_1$ similar to switch $M_2$, explained above. When detent 25 of lever 23 rides the outer surface of cam 26, then the micro switch $M_1$ will be in the NO position as shown in Fig. 1. However, when detent 25 drops into slot 31 the micro switch $M_1$ will be then placed in the NC position by its own resiliency.

Take-up spool 22, which is mechanically driven by gear 17 through the spring clutch 19 described below, winds up the film 39 supplied from film supply spool 40, film 39 passing over and driving rollers 41 and 42. Roller 42 is integral with cam 26 and thereby drives the latter. Film supply spool 40 is provided with a casing 43 having a drum 43a for braking, the shoes 44 being provided to accomplish this purpose. The shoes 44 are actuated by a solenoid device 45 which acts through a plunger 46 and a common type of linkage 47. The solenoid device 45 is biased in a well known manner so that braking of spool 40 occurs as long as solenoid coil $K_2$ (Fig. 3) within the device 45 is not being energized. Energization of coil $K_2$ releases spool 40 for rotation. Thus, energization of coil $K_2$ occurs only when film 39 is moving, preventing excessive use and preventing overheating of the solenoid.

Figure 2:
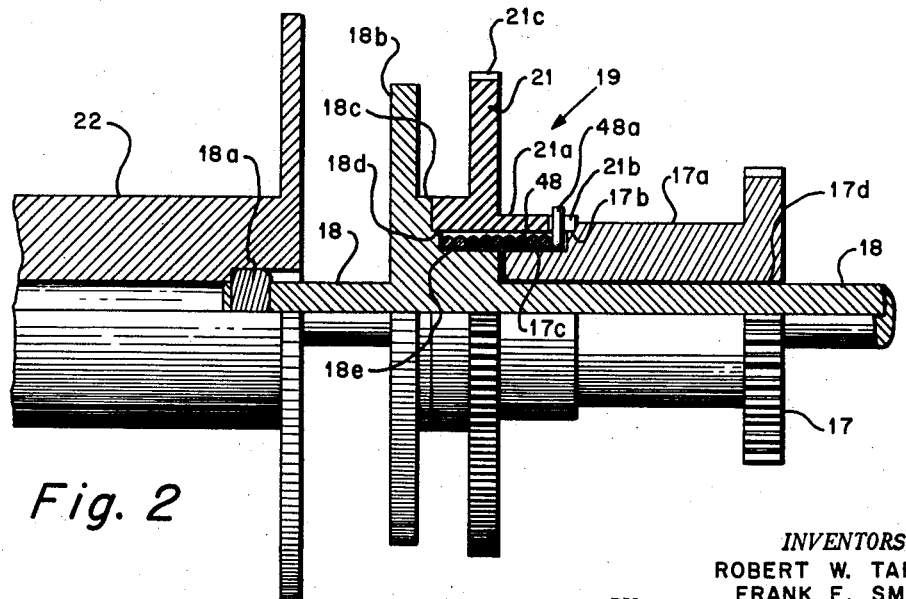
Fig. 2 is a view along 2—2 of Fig. 1.

As previously noted, gear 17 drives take-up spool 21 through a spring clutch 19 shown particularly in Fig. 2. The input to clutch 19 is through gear 17 which is provided with a sleeve 17a and shoulders 17b and 17c. The output of clutch 19 is through shaft 18 and key 18a to take-up spool 22 upon which film 39 is wound. Shaft 18 juts out opposite the end supporting spool 22 for the usual bearings and structural members (not illustrated). Shaft 18 passes through a hole 17d in gear 17 and forms a flange 18b and shoulders 18c, 18d and 18e. It will be noted that shoulders 18e and 17c have equal diameters for supporting a tightly wound coil spring 48. Spring 48 is provided with a radially pointing end piece 48a. Superimposed over spring 48 is the ratchet member 21 having a hub 21a supported at its ends by shoulders 18d and 17b. Hub 21a is provided with a slot 21b through which the coil end 48a protrudes.

The spring clutch 19 functions as follows:

Gear 17 is rotated at a constant speed by pinion 7 and input shaft 5, as already noted. The torque is transmitted from shoulder 17c to shoulder 18e of shaft 18 through the frictional action of coil 48 which is wound in such a manner that it tends to tighten when turned in the direction the gear 17 is rotating. Thus, in normal driving operation, gear 17, spring 48 and shaft 18 rotate as a single unit. Since ratchet wheel 21 is keyed to spring 48 at slot 21b, the former also rotates as part of this unit. When lever 23, from Fig. 1, is swung so that pawl 30 engages ratchet teeth 21c of ratchet wheel 21, the latter is brought to a halt. Since coil spring 48 is keyed to wheel 21, it ceases to rotate also. The action of slot 21b on extension 48a of coil spring 48 is opposite to that of shoulder 17c and tends to unwind coil spring 48 which thereby increases in diameter. Frictional contact between coil spring 48 and shoulder 17c is lost and the clutch is effectively disengaged. While clutch 19 is disengaged, it will be noted that gear 17 continues its normal rotation without interruption while shaft 18 supporting the take-up spool 22 comes to a halt under the load of the film 39 and spool 40. Spool 22 does not stop instantaneously due to the effects of inertia in the rotating parts. When pawl 30 is disengaged from teeth 21c, spring 48 is released and tightens over shoulder 17c thereby causing resumption of drive through clutch 19.

The operation of the mechanical arrangement shown in Figs. 1 and 2 is explained as follows: Shaft 5 is driven by a constant speed motor (not shown) and, therefore, cam 6 and pinion 7 are rotated at a constant speed. Once each cycle of cam 6, when the raised portion 11 contacts the follower extension 14 of lever 8, micro switch $M_2$ is moved from the NC position to the NO position, for reasons explained further below. Pinion 7 drives gear 17 continuously, and during the portion of the cycle when film 39 is moving, the follower extension 14 rides against the bottom surface of cam 6 and detent 25 of lever 23 rides along the outer surface of cam 26. Under these circumstances, pawl 30 is not engaged with ratchet teeth 21c. When cam 26 rotates to such a point that detent 25 drops into slot 31, pawl 30 is swung into engagement with teeth 21c, thus bringing to an instantaneous halt the movement of the ratchet member 21, shown in Fig. 2. This causes gear 17, which had been driving the take-up spool 22 continuously through spring clutch 19, to slip the latter and thereby rotate free. Ratchet member 21 and take-up spool 22 cease to be driven, and come to a halt after the inertia effects are dissipated. As cam 6 continues to rotate because of the input drive at shaft 5, raised portion 11 of cam 6 contacts the tip of the lateral extension 28 of lever 23 to raise detent 25 out of slot 31 and thereby take pawl 30 out of contact with ratchet teeth 21c, initiating a new cycle. Of course, when pawl 30 is disengaged from the ratchet teeth 21c spring clutch 19 shown in Fig. 2 will become reengaged and film 39 will resume movement.

This arrangement also insures that the exact length of film is fed each cycle. For example, when detent 25 is raised out of slot 31 to start a new cycle, detent 25 will not drop into slot 31 again until the roller 42 driven by film 39 makes one complete rotation. When the length of film to be measured off each cycle is 9½ inches, the circumference of roller 42 is designed for this length. When detent 25 drops into slot 31 at the end of each cycle marking off exactly the right length of film, the spring clutch assembly will permit the input shaft 5 to continue to drive gear 17 with the spring clutch disengaged. Therefore, the fact that the film continually builds up on take-up spool 22 does not affect the amount of film fed during each complete cycle since roller 42 measures a length of film, not the diameter of spool 22.

Figure 3:
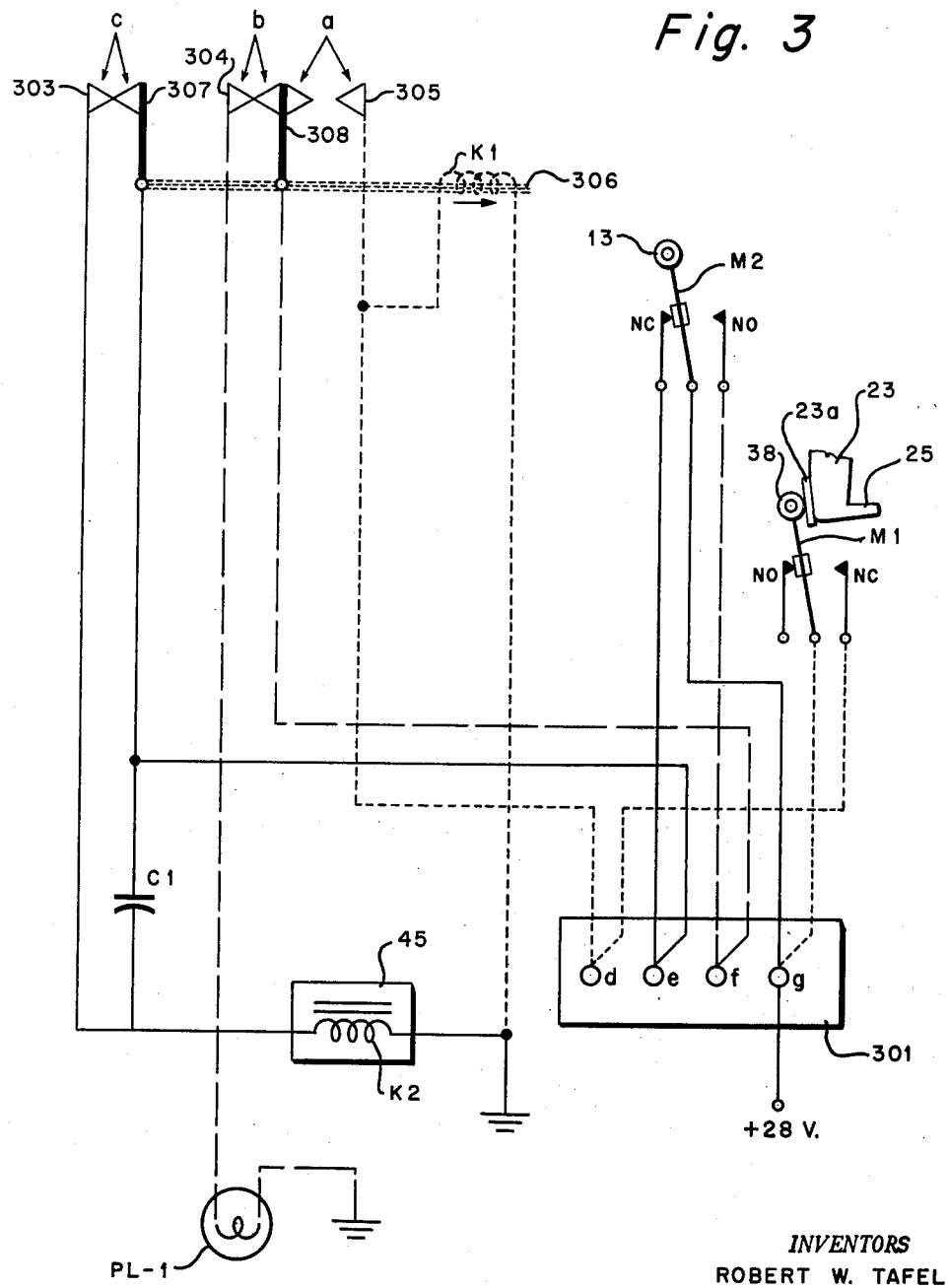
Fig. 3 is the electrical wiring diagram for the brake control and film failure circuit of the embodiment of Figs. 1 and 2.

As it will be recalled, the arrangement of Fig. 1 shows micro switches $M_1$, $M_2$, and the electro-magnetic brake for spool 40. The novel electrical system interconnecting these switches and brake is shown in Fig. 3. This electrical system is designed for the automatic cyclic control of the feeding of this film as well as the positive actuation of the brake shoes 44 and a fool-proof system which indicates any failure in the film feeding mechanism or breakage of the film itself.

Fig. 3 shows a control relay $K_1$ possessing a plurality of contacts a, b, and c, which are made and broken by the actuation of the former. Movable posts 307 and 308 are linked mechanically to core 306 which is positioned in accordance with energization or deenergization of relay K₁. Posts 303, 304 and 305 are stationary. When relay K₁ is energized, only contact at $a$ is made as core 306 is urged toward the center of the coil in relay K₁. When the latter is deenergized, core 306 is urged by a spring (not illustrated) so as to make contacts $b$ and $c$. A condenser C₁, which may be .02 microfarad, is placed across contact $c$ to prevent arcing. The solenoid coil K₂ located in brake device 45, is shown in its energized state, with no braking, to correspond with Fig. 1.

A panel board 301 having electrical posts $d$, $e$, $f$, and $g$ permits switching of circuits by micro switches M₁ and M₂. Switch M₁ is connected across posts $d$ and $g$ in its NC position. Position NO is an open connection. Switch M₂ is placed across posts $e$ and $g$ in its NC position, and across $f$ and $g$ in its NO position. Switches M₁ and M₂ are shown in their NO and NC positions, respectively, to correspond with the portion of the cycle illustrated in Fig. 1, that is, with film 39 moving, detent 25 riding on the outer surface of cam 26, and cam follower 14 riding on the lower surface of cam 6.

Fig. 3 also shows the pilot light PL-1 connected between contact $b$ and ground for indicating breakage of film 39, functioning as hereinafter explained, and the 28 D.C. voltage source.

The operation of the film breakage warning and braking system is as follows: Take-up spool 22 is rotated by input shaft 5 through spring clutch 19 in the condition of the apparatus shown in Fig. 1. Detent 25 of lever 23 rides the outer surface of cam 26, and lever 8 rides with its cam follower portion 14 on the lower surface of cam 6. Switches M₁ and M₂ are then in their NO and NC positions, and relay K₁ and solenoid coil K₂ are deenergized and energized, respectively. Film supply spool 40 is unbraked due to the energization of solenoid coil K₂. It will also be noted that contacts $b$ and $c$ of the relay K₂ are closed due to the latter's deenergization, however, pilot light PL-1 does not receive energy because it is connected through contact $b$ to post $f$ of panel board 301 to contact position NO of switch M₂ which is open.

Cams 26 and 6 are synchronized so that detent 25 drops into slot 31 before lever 8 is raised by the raised portion 11 of cam 6. When detent 25 strikes the shoulder 37 of guard 32 as the cam 26 rotates into this position, detent 25 will drop into slot 31 causing the movement of switch M₁ into its NC position. This permits relay K₁ to become energized, opening contacts $b$ and $c$, and deenergizing brake solenoid K₂ with the subsequent braking of film supply spool 40. Of course, when detent 25 drops into slot 31, pawl 30 engages the ratchet teeth 21c forcing spring clutch 19 to slip as previously noted, and bringing to a halt the movement of take-up spool 22. Due to the load on braking device 45, there is a slight lag in the actuation of the brake shoes 44 for the supply spool 40. There is then a slight overrun of spool 40 which compensates for the overrun of take-up spool 22 which, when disconnected from drive shaft 5, comes to a stop after a slight overrun due to inertia effects. Thus, there is no formation of any slack loop of film due to the overtravel of supply spool 40, and there is no possibility of film breakage due to overtravel of spool 22 because spool 40 has some overtravel of its own. Pilot light PL-1 does not light up because contact $b$ is broken.

A short period of time after detent 25 drops into slot 31, lever 8 is actuated by cam 6 and switch M₂ is moved into its NO position. There is no change in the energization of relay K₁ and the deenergization of solenoid K₂, it will be noted from a study of the circuit. Subsequently, as cam 6 rotates further, with detent 25 of lever 23 still in slot 31; switch M₂ is returned to its NC position.

As cam 6 rotates further, its raised portion 11 catches the lateral extension 28 of lever 23, raising detent 25 out of slot 31 of cam 26. Spring clutch 19 reengages and a new cycle of film movement begins.

The complete cycle described above is summed up in Table 1 below:

| Step | Switch M₁ | Switch M₂ | Relay K₁ | Relay K₂ |
|---|---|---|---|---|
| (1) | NO | NC | Deenergized | Energized. |
| (2) | NC | NC | Energized | Deenergized. |
| (3) | NC | NO | ----do------ | Do. |
| (4) | NC | NC | ----do------ | Do. |
| (1) | NO | NC | Deenergized | Energized. |

The film breakage warning system functions in the following manner: When a breakage of film 39 occurs during its period of movement, that is, before detent 25 drops into slot 31, cam 26 will cease to rotate since roller 42 will no longer be driven by film 39. Therefore, only cam 6 continues to rotate. When cam 6 turns to its position to raise lever 8, switch M₂ is moved into its NO position. Since switch M₁ remains in its NO position due to the failure of cam 26 to rotate and permit lever 23 to be actuated, relay K₁ remains deenergized, contact $b$ remains closed, and there is a continuous circuit supplying power to pilot PL-1 which then lights up indicating a failure. Thus, in order for the movement of lever 8 not to indicate a failure, its actuation must be preceded by a full cycle of cam 26 ending with the actuation of lever 23 by detent 25 falling into slot 31. This would indicate that there was no breakage of the film 39 or other failure during that cycle.

If film 39 should break while detent 25 is in slot 31, then, without the presence of guard 32, the movement of cam 6 would merely raise lever 23 to initiate each cycle, but detent 25 would merely drop back into slot 31 due to lack of movement of cam 26. Thus, when cam 6 subsequently actuates lever 8, detent 25 will have remained in slot 31 and pilot light PL-1 would fail to glow, as if the film 39 had moved a whole cycle. However, in the arrangement shown, guard 32, as explained above, falls back to cover slot 31 when lever 23 is raised by cam 6, insuring that if film breakage had occurred while detent was inside of slot 31, detent 25 will not be in slot 31 when cam 6 rotates to actuate lever 8 and thereby defeat the warning system provided.

It is thus seen that there has been provided a device which is reliable and positive acting which includes an important safety feature preventing film breakage due to spool overtravel, and in addition, which includes a positive warning indicator which will function at any point in the operating cycle.

Although this device has been described as particularly adaptable to the feeding of film in high speed cameras such as those found aloft, it would be apparent to one skilled in the art that its use would extend to situations calling for the intermittent feeding of a strip of material where the factors of reliability and positive action are considered important.

Obviously, many modifications and variations of the present invention are possible in the light of the above teachings. It is, therefore, to be understood that within the scope of the appended claims the invention may be practiced otherwise than as specifically described.

What is claimed is:

1. In a camera magazine for feeding film intermittently, a supply spool for carrying the supply of film, a mechanically driven spool for taking up said film, a roller between said spools for carrying said film and for being driven thereby, cam means having a surface with a slot driven by said roller, mating means biased against said cam surface for falling into said slot each cycle to terminate each film feeding cycle, electrical switch means responsive to said mating means falling into said slot for initiating locking of said supply spool to prevent overrun of the film thereon, means for raising said mating means out of said slot to unlock said supply spool and initiate the succeeding film feeding cycle, and normally inactive film breakage indicating means operatively connected to said raising means for becoming energized and indicating said breakage when said cam means fails to complete the full cycle.

2. In a camera magazine for feeding film intermittently, a supply spool for carrying the supply of film, a mechanically driven spool for taking up said film, a roller between said spools for carrying said film and for being driven thereby, cam means having a surface with a slot driven by said roller, mating means biased against said cam surface for falling into said slot each cycle to terminate each film feeding cycle, electrical switch means responsive to said mating means falling into said slot for initiating locking of said supply spool to prevent overrun of the film thereon, means for raising said mating means out of said slot to initiate the succeeding film feeding cycle, normally inactive film breakage indicating means operatively connected to said raising means for indicating said breakage when said cam means fails to complete the full cycle and safety means connected to said cam means for insuring that said film breakage indicating means will function between succeeding film feeding cycles.

3. In a camera, in combination, a film supply spool, an exposed film spool adapted to have wound thereon film subsequent to exposure, means including a clutch for driving the latter spool to wind film thereon after exposure, solenoid means, brake means activated by said solenoid means for preventing rotation of said film supply spool upon deenergization of said solenoid means, and automatic means for braking said exposed film spool, disengaging said clutch and deenergizing said solenoid means at the end of a predetermined film winding cycle, and said solenoid means being deenergized before said exposed film spool is braked and said clutch is disengaged.

4. In a camera, in combination, a film supply spool, an exposed film spool adapted to have wound thereon film after exposure, means including a clutch for driving the latter spool to wind film thereon after exposure, means for controlling the operation of said driving means to limit the amount of film wound thereon during one film winding cycle by sequentially engaging and disengaging said clutch, solenoid means, brake means actuated by said solenoid means for stopping rotation of said supply spool upon deenergization of said solenoid means, and means responsive to said controlling means for braking said exposed film spool, disengaging said clutch and deenergizing said solenoid means at the end of a winding cycle, and said exposed film spool being braked after said solenoid means are deenergized.

5. In a camera for feeding film intermittently, a first spool for carrying the supply of film, a second spool for taking up said film after exposure, means for driving said second spool through a clutch, cam means having a slot in the outer surface thereof driven by said film, actuating means riding on said cam means and falling into said slot at the end of each cycle, solenoid means, braking means for said first spool responsive to deenergization of said solenoid means, means responsive to said actuating means falling into said slot causing release of said clutch after deenergizing said solenoid means, and means responsive to said driving means for reengaging said clutch by raising said actuating means out of said slot to begin another complete cycle of film movement.

6. In a camera for feeding film intermittently, a first spool for carrying the supply of film, a second spool for taking up said film after exposure, means for driving said second spool through a clutch, first cam means driven by said driving means, second cam means having a slot in the outer surface thereof driven by said film, actuating means riding on said second cam means and falling into said slot at the end of each cycle of film movement, solenoid means, braking means for said first spool responsive to deenergization of said solenoid means, means responsive to said actuating means falling into said slot causing release of said clutch to disconnect drive of said second spool and causing deenergization of said solenoid means to brake said first spool, and means responsive to said first cam means for releasing said actuating means from said slot after a predetermined period of time for energizing said solenoid means thereby releasing said first spool and reengaging said clutch to continue drive of said second spool.

7. In a camera for feeding film intermittently, a first spool for carrying the supply of film, a second spool for taking up said film after exposure, means for driving said second spool through a clutch, first cam means driven by said driving means, second cam means driven by said film, actuating means in engagement with and brought into an actuated position by said second cam means at the end of each cycle of film movement, solenoid means, braking means for said first spool responsive to deenergization of said solenoid means, means responsive to actuation of said actuating means causing release of said clutch and deenergization of said solenoid means, means responsive to said first cam means for releasing said actuating means after a predetermined period of time for reenergizing said solenoid means thereby releasing said first spool and reengaging said clutch to continue drive of said second spool, and film breakage indicating means responsive in part to said actuating means to indicate film breakage.

8. In a camera for feeding film intermittently, a first spool for carrying the supply of film, a second spool for taking up said film after exposure, means for driving said second spool through a clutch, first cam means driven by said driving means, second cam means driven by said film, first and second actuating means riding in engagement with said first and second cam means, respectively, solenoid means, braking means for said first spool responsive to deenergization of said solenoid means, means responsive to said second actuating means being brought into an actuated position by said second cam means causing release of said clutch and deenergization of said solenoid means, means responsive to said first cam means for releasing said second actuating means from actuated position after a predetermined period of time for reenergizing said solenoid means thereby releasing said first spool and reengaging said clutch to continue drive of said second spool, said first actuating means synchronized to be energized by said first cam means during said period of time, and film breakage indicating means responsive to energization of said first actuating means when said second actuating means is not in its actuated position for indicating film breakage.

9. The camera of claim 8 in which safety means on said second cam means is provided for insuring that said film breakage indicating means will function if breakage should occur between cycles of film movement.

10. In a camera for feeding film intermittently a first spool for carrying the supply of film, a second spool for taking up said film after exposure, means for driving said second spool through a clutch, first cam means driven by said driving means, second cam means having a slot in the outer surface thereof driven by said film, first and second actuating means riding in engagement with said first and second cam means, respectively, said second actuating means upon falling into said slot causing release of said clutch, means responsive to said first cam means for releasing said second actuating means from said slot after a predetermined period of time for reengaging said clutch to continue drive of said second spool, and film breakage indicating means responsive in part to said first actuating means to indicate film breakage.

11. In a camera for feeding film intermittently, a first spool for carrying the supply of film, a second spool for taking up said film after exposure, means for driving said second spool through a clutch, first cam means driven by said driving means, second cam means driven by said film, first and second actuating means riding in engagement with said first and second cam means, respectively, said second actuating means upon being brought into an actuated position by said second cam means causing release of said clutch, means responsive to said first cam means for releasing said second actuating means after a predetermined period of time for reengaging said clutch to continue drive of said second spool, and normally inactive film breakage indicating means responsive to the failure of said first actuating means to function for indicating film breakage.

References Cited in the file of this patent

UNITED STATES PATENTS

| | | |
|---|---|---|
| 1,286,331 | James | Dec. 3, 1918 |
| 1,968,166 | Phythian et al. | July 31, 1934 |
| 1,995,722 | Smith | Mar. 26, 1935 |
| 2,380,034 | Doyle | July 10, 1945 |